TERMINAL ARRANGEMENTS FOR ELECTRICAL WIRING

Filed March 23, 1962 3 Sheets-Sheet 1

INVENTORS
REGINALD CHARLES SMITH
ALFRED BAKER.
BY Irwin S. Thompson
ATTY.

TERMINAL ARRANGEMENTS FOR ELECTRICAL WIRING

Filed March 23, 1962 3 Sheets-Sheet 2

INVENTORS
REGINALD CHARLES SMITH
ALFRED BAKER
BY
Irwin S. Thompson

TERMINAL ARRANGEMENTS FOR ELECTRICAL WIRING

Filed March 23, 1962 3 Sheets-Sheet 3

INVENTORS
REGINALD CHARLES SMITH
ALFRED BAKER
BY Irwin S. Thompson
ATTY.

United States Patent Office 3,173,062
Patented Mar. 9, 1965

3,173,062

TERMINAL ARRANGEMENTS FOR ELECTRICAL WIRING

Reginald Charles Smith and Alfred Baker, both of Liverpool, England, assignors to Automatic Telephone & Electric Company Limited, Liverpool, England, a British company Filed Mar. 23, 1962, Ser. No. 181,910
Claims priority, application Great Britain, Apr. 29, 1961, 15,583/61
5 Claims. (Cl. 317—118)

This invention relates to terminal arrangements for electrical wiring, and is particularly concerned with arrangements which comprise a terminal block such as is commonly employed, for example, for making electrical connections to and/or among items of electrical equipment mounted on an equipment rack, such terminal blocks being commonly mounted on the rack in a position which makes them accessible from the front of the rack.

In terminal blocks of this type, not all the terminals serve the same purpose. For example, some may be required solely to interconnect equipments on a rack, or equipments on different racks. Others may be required to incorporate test points to which external measuring equipment can be connected, by means of sockets, for example, or which may be connectible to other test points by means of externally applied test links. Others may be required to combine these functions. Again, some terminals may require screening to obviate cross-talk or other types of radiation. It frequently happens that several terminal blocks are needed on a single rack of equipment, each block requiring different combinations of screened and unscreened terminals, and of terminals with and without access from the front of the rack. To cater for these requirements without the complication and expense of providing several different designs of terminal block it would be possible to provide a block in which each terminal set is screened from each other set, and in which all terminals are provided with socket connectors accessible from the front of the rack. This is still an expensive expedient and is likely to be more extravagent of space than a terminal block specially designed for one application.

It is an object of the invention to provide a terminal block which is simple, compact and cheap to manufacture, and which can cater for a large number of different requirements in providing terminals, access sockets, and screening as required, and into which other elements such as indicators, attenuators and so on can be readily incorporated.

A terminal arrangement according to the invention comprises a terminal block divided into a plurality of segments, a single segment containing one or more electrical conductors, for example in the form of wiring terminals, socket connectors, screening plates, resistors and so on, the segments being insulated from one another and adapted, when assembled in a stack, to fit into a mounting frame.

According to a feature of the invention, the segments are interlocking.

Figure 1:
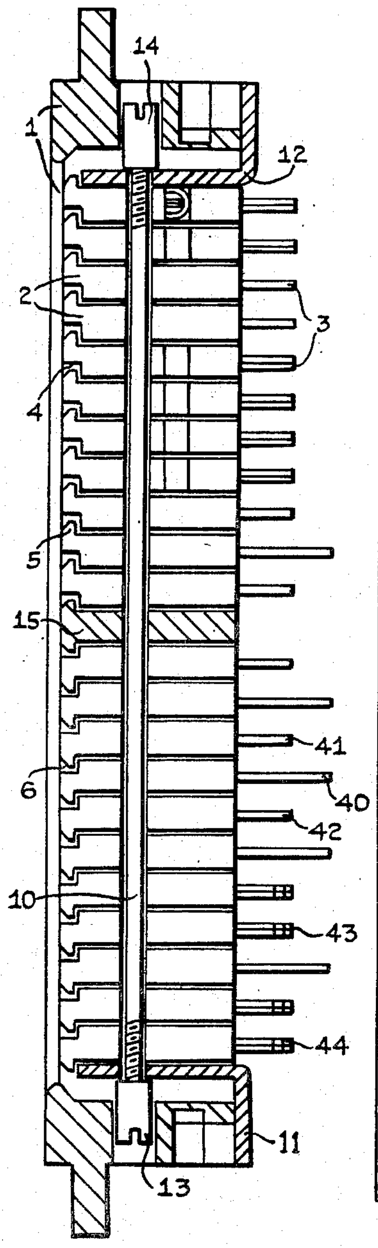
Figure 6:
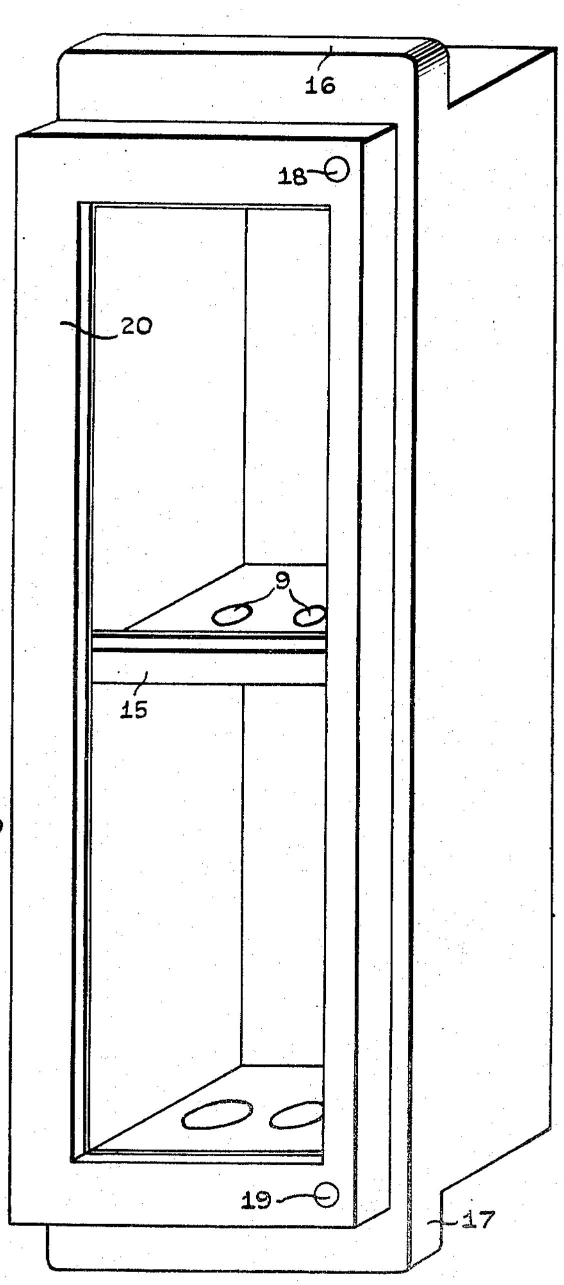

Other features of the invention will appear from the following description of one embodiment, which should be read in conjunction with the accompanying drawings, comprising FIGS. 1–6. Of the drawings, FIG. 1 is a side elevation in section of an assembled terminal block and mounting frame according to the invention, FIGS. 2–5 illustrate segments of the terminal block, and FIG. 6 is a view of a mounting frame for the terminal block.

The form of construction of the arrangement can be seen from FIG. 1, which is a side elevation, in section, of a complete terminal block assembly housed within a frame. The frame, which will be described in more detail with reference to FIG. 6, is indicated at 1, and is shown containing a terminal block comprising a number of segments such as 2. While these segments are also shown in section, shading lines have been omitted to avoid obscuring the drawing. The segments each comprise a piece of insulating material, which is moulded from a plastic material in the preferred embodiment, within which are accommodated electrical conductors of the required configuration. Wiring terminals for these conductors project from the side of the segments which face the inside of the rack upon which the terminal block is mounted, such wiring terminals being indicated for example at 3. On the oposite side of the segments, which face outwards from the rack, a projection is provided along one edge, as indicated at 5, and a corresponding recess of rectangular section is provided along the opposite edge, as indicated at 4. When a stack of segments is assembled, the projection 5 on one segment fits into the recess 4 of the adjacent segment.

Figure 2:
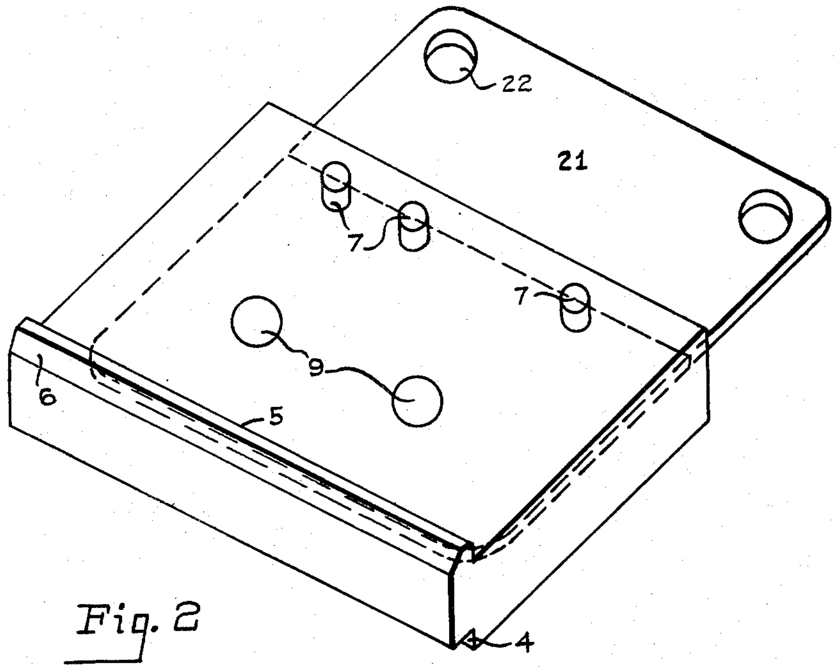

At this point reference should be made to FIG. 2, which shows a typical segment, on which these features can be seen. It will be noticed from this drawing that small studs, 7, are provided on one main surface of each segment, which engage with corresponding recesses or indentations on the opposite face of an adjacent segment in the assembly. Such indentations are illustrated for example at 8 in FIG. 3, which shows a segment turned upside down relative to the representation in FIG. 2. It will be obvious that the two features just mentioned, i.e. the overlapping projections and recesses on the edges of the segments, and the engagement between the studs and indentations, provide a certain amount of interlocking of the segments, which ensures that the segments are accurately aligned, and generally facilitates assembly of a terminal block. These two features, however, also serve another purpose, which will appear from the description of the socket connector type of segment later, but it may be mentioned here that the projection 5 and studs 7 are used to locate and secure the conductors in this type of segment. The reason for chamfering the corner 6 of each projection 5 is also connected with the use of the socket connector type of segment.

Returning now to the assembly of segments into a terminal block, the segments are clamped together by means of two screw threaded rods, which pass through two holes such as 9 provided in each segment. One of these rods can be seen in the section view of FIG. 1, where it is indicated by the reference 10. The assembly is completed by clamping plates 11 and 12, placed at the two ends of the assembly, and by nuts 13 and 14 at the two ends of each rod such as 10. It will be seen by reference to FIG. 1 that the mounting frame includes a platform 15, centrally placed in the frame. The side of this platform which faces outwards from the rack is provided with two projections, one along each edge, similar to the projection 5 on the individual segments. It is this platform which locates and secures the assembly of segments in the mounting frame. The segments below the platform are reversed relative to those above the platform, giving a symmetrical arrangement which enables similar clamping plates 11 and 12 to be used. The platform 15 is also provided with two holes 9 to accommodate the clamping rods, and in this connection it may be pointed out that the holes 9 in the individual segments are symmetrically placed so that any segment can occupy a position above or below the platform.

Reference to FIG. 6 will make the physical construction of the mounting frame clear. This view shows the frame as it appears looking at the rack on which it is mounted. Both the front and the back of the frame are open to provide access to socket contacts where these are provided and to the wiring terminals, respectively. The mounting frame of the preferred embodiment is a single moulding in an insulating plastic material, suitably shaped with projections 16 and 17 at top and bottom for locating on the equipment rack and provided with screw holes such as 18 and 19 for securing it to the rack. The front opening is surrounded by a picture-frame type of moulding 20, to give a neat appearance to the front view.

The individual segments of the terminal block may contain metallic conductors in any convenient form, and if necessary could also include small electrical components such as indicator lamps, resistors and so on. Three examples of the most useful types of segment are shown in the drawings, FIGS. 2–5. FIG. 2 shows a screening segment, in which a metal plate 21 is included in the moulding. The plate will be of a magnetic material if magnetic screening is required. Holes are provided, as at 22, in the metal plate to enable earth connections to be made to it, and for this type of segment, the holes 9 would, of course, have their counterpart in the metal plate.

Figure 3:
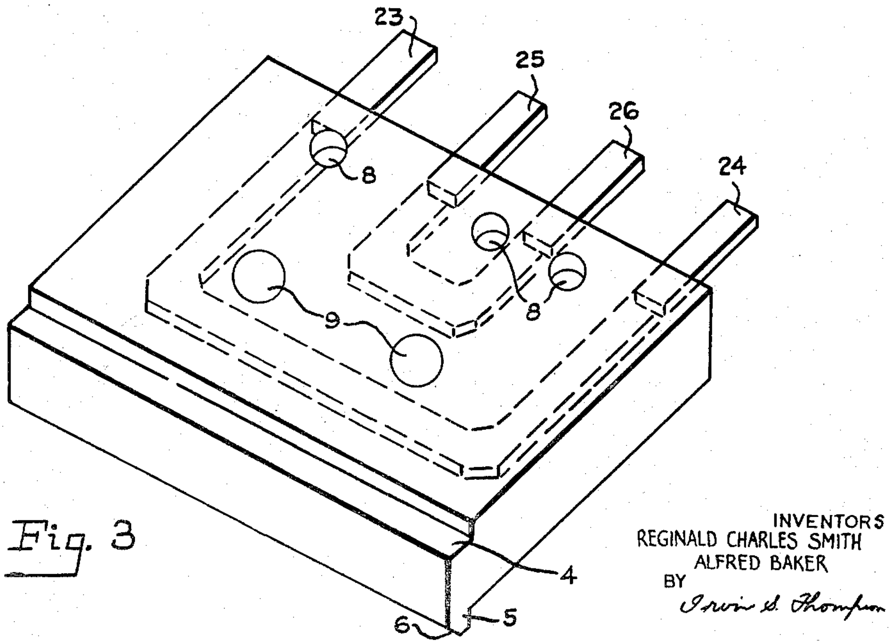
Figure 4:
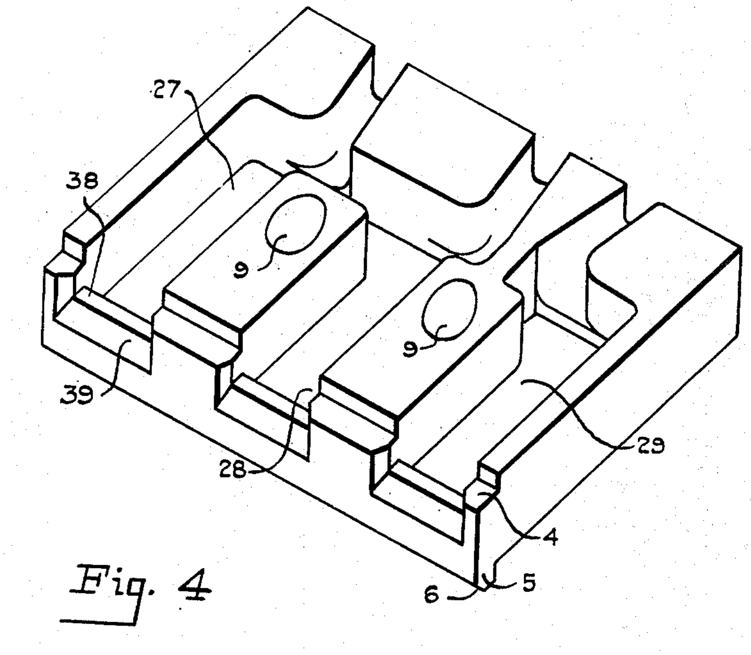
Figure 5:
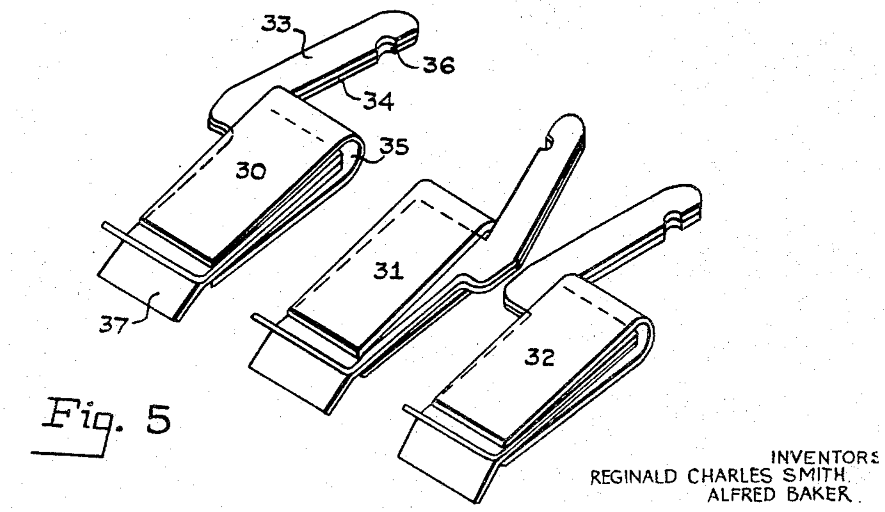

FIG. 3 shows a segment used for terminating purposes in which one conductor provides two wiring terminals 23 and 24 while a second conductor provides two further wiring terminals 25 and 26, the conductor inside the moulding being shown in broken lines in each case. This type of segment is useful where internal connections are to be made within an equipment rack, for terminating shelf-to-shelf wiring, rack-to-rack wiring, and so on. It will be obvious that a variety of configurations could be provided in this type of segment, the wiring terminals being isolated or joined electrically as required. No provision is made in this type of terminal arrangement for access to the terminals from the outside of the rack, and where such access is desired, the type of segment shown in FIGS. 4 and 5 is employed. The moulding in FIG. 4 provides three slots or channels, indicated generally at 27, 28 and 29, which accommodate the three similarly shaped conductors 30, 31 and 32 of FIG. 5. Each of these conductors comprises a pair of metal stampings such as 33 and 34, of similar shape, which are held together by means of a clip of springy material such as 35. At one end, the stampings 33 and 34 provide a wiring terminal 36, and at the other end the extremities are opened out into a Y shape, at 37, to provide with the assistance of the spring clip 35 a connecting socket member. The stampings 33 and 34 are preferably made from a resilient material and are plated with a precious metal to provide good electrical contact. These conductors are loosely inserted in the slots of the moulding, and are held in place by the next moulding in the assembly, the three studs 7 of which engage with the slots near the point at which the wiring terminal end of the conductors 30–32 emerge from the moulding, and serve to prevent undue movement of the wiring terminal when connections are being made to it. The socket end of the conductors are comparatively loosely held, this being advantageous when test links are being inserted from the front of the rack. However, it will be seen from FIG. 4 that a small ridge is provided at the outward facing end of each of the slots, as indicated for example at 38. This ridge, together with the projection 5 on the adjacent segment, defines the opening for the socket. The front edge of this ridge is chamfered as indicated at 39, and together with the chamfered edge 6 of the adjacent segment, provides a convenient lead-in for a test link.

It will be seen that a compact and versatile arrangement for terminal wiring has been provided from which an unlimited variety of terminal blocks can be assembled. The arrangement of FIG. 1 is typical, and shows the use of screening segments, distinguishable by the greater extension of the screening plates as at 40, interposed between terminating segments, for example at 41 and 42, or between socket connectors, distinguishable by the double wiring terminal, as at 43 and 44.

Although only the more common types of straightforward conductors and screens have been described, it will be obvious that more complicated wiring, incorporating attenuators for example, could equally well be encapsulated in segments of this type, and those skilled in the art could readily build more complex terminal blocks on the principle of the embodiment described. Similar remarks apply to the mechanical details of the assembly, it being understood that the invention is not limited to the precise mechanical arrangement shown in the drawings nor to the materials mentioned.

We claim:

1. A terminal arrangement for electrical wiring comprising a mounting frame, an insulating platform secured within said frame in parallel relationship to the smaller sides of the frame, a plurality of segments of insulating material, electrical conductors contained within said segments and having externally-extending terminal portions and means for clamping said segments to said platform in stack formation on each side of said platform whereby said segments are wholly supported by said platform and said terminal portions protrude from the rear face of each stack.

2. A terminal arrangement as claimed in claim 1, and including at least one slotted segment, the electrical conductors being secured within the slots of said slotted segment and access to said electrical conductors being obtained by way of said slots from the front face of the appropriate stack.

3. A terminal arrangement as claimed in claim 1, wherein the clamping means comprise a pair of threaded rods each passing through alined holes in said segments and said platform, each rod having at each end a nut restricted against transverse movement.

4. A terminal arrangement for electrical wiring comprising a mounting frame, an insulating platform secured within said frame in parallel relationship to the smaller sides of the frame, a plurality of segments of insulating material, electrical conductors embedded within said segments and having externally-extending terminal portions and means for clamping said segments to said platform in stack formation on each side of said platform whereby said segments are wholly supported by said platform and said terminal portions protrude from the rear face of each stack.

5. A terminal arrangement for electrical wiring components comprising a mounting frame, an insulating platform secured within said frame in parallel relationship to the smaller sides of the frame, a plurality of slotted segments of insulating material, electrical conductors secured within the slots of said segments and having externally-extending terminal portions and means for clamping said segments to said platform in stack formation on each side of said platform whereby said segments are wholly supported by said platform and said terminal portions protrude from the rear face of each stack.

References Cited by the Examiner

UNITED STATES PATENTS

| | | | |
|---|---|---|---|
| 1,728,330 | 9/29 | Burli | 339—198 |

FOREIGN PATENTS

| | | |
|---|---|---|
| 152,585 | 7/53 | Australia. |
| 233,820 | 5/25 | Great Britain. |

LARAMIE E. ASKIN, *Primary Examiner.*

JOHN F. BURNS, *Examiner.*